United States Patent
Yamaguchi et al.

(10) Patent No.: US 8,391,170 B2
(45) Date of Patent: Mar. 5, 2013

(54) COMMUNICATION CHARACTERISTIC MEASURING DEVICE ADAPTED TO WIRELESS TERMINAL

(75) Inventors: Akira Yamaguchi, Fujimino (JP);
Kanshiro Kashiki, Fujimino (JP);
Takashi Fujimoto, Fujimino (JP);
Kazunori Takeuchi, Fujimino (JP)

(73) Assignee: KDDI R&D Laboratories Inc., Saitama-ken (JP)

( * ) Notice: Subject to any disclaimer, the term of this patent is extended or adjusted under 35 U.S.C. 154(b) by 300 days.

(21) Appl. No.: 12/645,024

(22) Filed: Dec. 22, 2009

(65) Prior Publication Data

US 2010/0165864 A1 Jul. 1, 2010

(30) Foreign Application Priority Data

Dec. 25, 2008 (JP) ................................ P2008-329901

(51) Int. Cl.
*H04J 1/16* (2006.01)
(52) U.S. Cl. ........................................ 370/252; 370/310
(58) Field of Classification Search .................. 370/229, 370/330, 230.1, 231, 232, 233, 234, 235, 370/236, 236.1, 252, 254, 278, 331, 334, 370/310, 315, 328, 329, 338, 339, 400, 401, 370/445, 465, 431; 455/67.11, 69, 67.16, 455/74, 68, 67.13, 67.14, 114.2, 114.3, 115, 455/118, 222, 225, 226.1, 112, 101, 129, 455/269, 276.1, 226.2, 226.3, 444, 421, 426, 455/452.1, 452.2, 446, 450, 453, 436, 437, 455/438, 500, 509, 552.1, 553.1, 553, 552, 455/551, 561, 575.7, 562.1; 375/260, 267, 375/152; 348/143, 372, 14.01; 725/62
See application file for complete search history.

(56) References Cited

U.S. PATENT DOCUMENTS 5,987,334 A * 11/1999 Kaku .......................... 455/552.1

(Continued)

FOREIGN PATENT DOCUMENTS

JP 2007-150859 A 6/2007
JP 2007-208571 A 8/2007

(Continued)

OTHER PUBLICATIONS

Tadayuki Fukuhara, Sachiko I.Yamanaka, Akira Yamaguchi, Sadao Obana, "Delay measurement method for cognitive wireless access network", the Institute of Electronics, Information and Communication Engineers, 2006 Society Convention, B-17-19, Sep. 2006.

(Continued)

*Primary Examiner* — Abdullah Riyami
(74) *Attorney, Agent, or Firm* — Morgan, Lewis & Bockius LLP

(57) ABSTRACT

A cognitive terminal includes different types of radio modules suiting to different types radio media employed by a cognitive base station in the radio communication system. The radio module of the cognitive terminal counts the number of times it receives/transmits ACK/NACK in each unit time. A radio environment cognition unit of the cognitive terminal performs calculations using the count number(s) in consideration of the packet transmission time interval or the time required for repeating a single data packet, thus measuring characteristics of delay time variations in uplink/downlink communication with respect to each radio media. Thus, it is possible for the cognitive terminal to switch over radio media based on ACK/NACK in uplink/downlink communication.

7 Claims, 10 Drawing Sheets

U.S. PATENT DOCUMENTS

| | | | | |
|---|---|---|---|---|
| 6,018,555 | A * | 1/2000 | Mahany | 375/347 |
| 6,195,046 | B1 * | 2/2001 | Gilhousen | 342/457 |
| 6,804,201 | B1 * | 10/2004 | Gelenbe | 370/255 |
| 7,171,223 | B2 * | 1/2007 | Herscovich et al. | 455/500 |
| 7,253,730 | B2 * | 8/2007 | Trela et al. | 340/539.11 |
| 7,321,580 | B1 * | 1/2008 | Ramanathan et al. | 370/339 |
| 7,403,748 | B1 * | 7/2008 | Keskitalo et al. | 455/101 |
| 7,688,203 | B2 * | 3/2010 | Rockefeller et al. | 340/541 |
| 7,801,490 | B1 * | 9/2010 | Scherzer | 455/67.13 |
| 7,990,912 | B2 * | 8/2011 | Nix et al. | 370/328 |
| 2002/0071416 | A1 * | 6/2002 | Carlson et al. | 370/338 |
| 2004/0137924 | A1 * | 7/2004 | Herscovich et al. | 455/500 |
| 2004/0185887 | A1 * | 9/2004 | Wolman et al. | 455/516 |
| 2005/0141459 | A1 * | 6/2005 | Li et al. | 370/334 |
| 2006/0069742 | A1 * | 3/2006 | Segre | 709/217 |
| 2006/0120302 | A1 * | 6/2006 | Poncini et al. | 370/254 |
| 2006/0224763 | A1 * | 10/2006 | Altunbasak et al. | 709/231 |
| 2006/0246942 | A1 * | 11/2006 | Ramachandran et al. | 455/553.1 |
| 2007/0169151 | A1 * | 7/2007 | Vishloff et al. | 725/62 |
| 2007/0201566 | A1 * | 8/2007 | Solomon et al. | 375/260 |
| 2008/0143694 | A1 * | 6/2008 | Tu et al. | 345/204 |
| 2008/0146267 | A1 * | 6/2008 | Tu et al. | 455/551 |
| 2008/0146269 | A1 * | 6/2008 | Pirzada et al. | 455/552.1 |
| 2008/0198819 | A1 * | 8/2008 | Brown et al. | 370/338 |
| 2008/0219286 | A1 * | 9/2008 | Ji et al. | 370/445 |
| 2009/0034636 | A1 * | 2/2009 | Kotecha et al. | 375/260 |
| 2009/0059879 | A1 * | 3/2009 | Yamaoka et al. | 370/338 |
| 2009/0149198 | A1 * | 6/2009 | Nam et al. | 455/456.2 |
| 2009/0154426 | A1 * | 6/2009 | Perraud et al. | 370/332 |
| 2009/0189981 | A1 * | 7/2009 | Siann et al. | 348/143 |
| 2009/0190482 | A1 * | 7/2009 | Blair | 370/250 |
| 2009/0247087 | A1 * | 10/2009 | Chin et al. | 455/67.14 |
| 2009/0285325 | A1 * | 11/2009 | Zhou | 375/267 |
| 2010/0003990 | A1 * | 1/2010 | Suemitsu et al. | 455/442 |
| 2010/0008312 | A1 * | 1/2010 | Viswanath | 370/329 |
| 2010/0022264 | A1 * | 1/2010 | Kwon et al. | 455/509 |
| 2010/0141762 | A1 * | 6/2010 | Siann et al. | 348/143 |
| 2010/0232436 | A1 * | 9/2010 | Fujii et al. | 370/400 |
| 2011/0194485 | A1 * | 8/2011 | Horneman et al. | 370/315 |

FOREIGN PATENT DOCUMENTS

| | | |
|---|---|---|
| JP | 2008-085759 | 4/2008 |
| JP | 2008-219673 A | 9/2008 |
| JP | 2008-538691 A | 10/2008 |
| WO | 2006/116191 A1 | 11/2006 |
| WO | 2009/133345 A1 | 11/2009 |

OTHER PUBLICATIONS

3GPP TS36.321 "E-UTRA MAC Protocol Specification", V8.2.0, May 2008.
3GPP TS36.322 "E-UTRA MAC Protocol Specification", V8.2.0, May 2008.
Contribution to 3GPP, 3GPP TSG RAN WG2 #62 R2-082229 "HARQ Process Management for Persistent Scheduling".
JPO—Japanese Patent Application No. 2008-329901—Office Action—Including English Translation—Dated Jul. 24, 2012.
Notice of Allowance issued in corresponding Japanese Patent Application No. 2008-329901 on Dec. 21, 2012, and English translation.

* cited by examiner

COMMUNICATION CHARACTERISTIC MEASURING DEVICE ADAPTED TO WIRELESS TERMINAL

BACKGROUND OF THE INVENTION

1. Field of the Invention

The present invention relates to radio communication systems implementing radio communications using wireless terminals via base stations by way of radio media and in particular to communication characteristic measuring devices that measure communication characteristics so as to switch over radio media in wireless terminals.

The present application claims priority on Japanese Patent Application No. 2008-329901, the content of which is incorporated herein by reference.

2. Description of the Related Art

Recently, various radio media such as wireless local area networks (LAN) and cellular phone networks have been developed, and various technologies have been developed to seamlessly integrate a variety of radio media.

Patent Document 1: Japanese Unexamined Patent Application Publication No. 2008-85759

Non-Patent Document 1: Tadayuki Fukuhara, Sachiko Yamanaka, Akira Yamaguchi, Sadao Obana, "Delay measurement method for cognitive wireless access network", the Institute of Electronics, Information and Communication Engineers, 2006 Society Convention, B-17-19, September 2006

Non-Patent Document 2: 3GPP TS36.321 "E-UTRA MAC Protocol Specification"

Non-Patent Document 3: 3GPP TS36.322 "E-UTRA MAC Protocol Specification"

Non-Patent Document 4: Contribution to 3GPP, 3GPP TSG RAN WG2 #62 R2-082229 "HARQ Process Management for Persistent Scheduling"

Patent Document 1 discloses that a variety of radio communication systems is integrated using cognitive terminals and cognitive base stations by way of a variety of radio media. Cognitive base stations detect radio environments so as to select radio media based on cognition results.

Non-Patent Document 1 discloses that delay time differences occurring between communication systems are measured as one indicator for detecting radio environments. Specifically, gateways (which are higher places in the hierarchical structure of communications than base stations) transmit "probe packets" exclusively used for measurement to terminals via various communication systems so as to measure delay time differences occurring between communication systems.

Non-Patent Document 2 discloses the standard for Media Access Control (MAC) of "Long Term Evolution (LTE)" in 3.9-Generation mobile system, which includes Hybrid Automatic Repeat Request (HARQ) for repeating packets. According to the HARQ in connection to uplink communication (for transmitting packets from terminals to base stations) and downlink communication (for transmitting packets from base stations to terminals), packet receivers (i.e. base stations in uplink communication or terminals in downlink communication) determine success or failure of reception every time they receive packets, wherein they send back "acknowledgement" (ACK) in the case of success of reception but sends back "negative acknowledgement" (NACK) in the case of failure of reception; hence, packet transmitters (i.e. terminals in uplink communication or base stations in downlink communication) repeat transmitting packets until they receive ACK.

Non-Patent Document 3 discloses the standard for the LTE regarding the repetition (or retransmission) of packets. The ARQ is a repetition method in a higher place of communication hierarchy than the HARQ. When packets are repeated the maximum number of times according to the HARQ but fail to reach destinations, the ARQ is activated to repeat packets again. The ARQ is mostly used as a remedy against feedback errors occurring in the HARQ.

Non-Patent Document 4 discloses the operation of the HARQ adapted to Voice over Internet Protocol (VoIP) communication, which normally employs "Persistent Scheduling" for repeating packets in units of 20 milli-seconds but which employs "Dynamic Scheduling" for dynamically determining the time for repeating packets in accordance with the HARQ. It discloses that the period of time required for repeating packets upon one HARQ is set to 8 milli-seconds, for example.

These conventional technologies have various drawbacks. That is, Patent Document 1 does not disclose the specific configuration for detecting radio environments. Non-Patent Document 1 suffers from the following drawbacks.

(a) The delay time characteristics are not determined per each individual communication system.
(b) Probe packets exclusively used for measurement consume communication resources for the purpose of measurement.
(c) Gateways are required to transmit probe packets and may easily face the shortage of processing abilities to cope with the increased number of terminals.

In real-time applications such as VoIP, it is important to detect delay time variations rather than delay time lengths. Pertaining to the LTE, Non-Patent Document 2 discloses that the ACK (representing the success of reception) or NACK (representing the failure of reception) is sent back per each packet, while Non-Patent Document 4 discloses that packets are repeated per predetermined period of time. Considering the above characteristics, it may be necessary to monitor the reception acknowledgement information such as ACK and NACK, and it may be necessary for terminals to measure communication characteristics representing delay time variations in uplink communication and downlink communication independently.

SUMMARY OF THE INVENTION

It is an object of the present invention to provide a communication characteristic measuring device which measures communication characteristics representing delay time variations based on the reception acknowledgement information with respect to uplink communication and downlink communication independently and with respect to radio media independently and which allows a wireless terminal to switch over radio media available in the radio communication system.

The present invention is directed to a communication characteristic measuring device which is adapted to a wireless terminal performing communication using a plurality of radio media via a base station in the radio communication system. The communication characteristic measuring device includes a plurality of radio modules and a radio environment cognition unit. The radio module obtains the reception acknowledgement information regarding a data packet which is transmitted to or received from a counterpart wireless terminal in a prescribed communication range with respect to each radio media independently. The radio environment cognition unit generates delay time variation data representing the characteristics of delay time variations based on the reception acknowledgement information with respect to each radio media and each direction of communication independently.

In a first aspect of the present invention, the radio module counts "B" representing the number of times it receives ACK in each unit time "A". The radio environment cognition unit calculates "C" representing an average reception time interval by way of an equation of $C=A \div B$, and then it calculates "E" representing an uplink average packet arrival time error by way of an equation of $E=D-C$ where D denotes a packet transmission time interval, thus measuring distribution characteristics of the uplink average packet arrival time error as delay time variation data in uplink communication.

Alternatively, the radio module counts "Bd" representing the number of times it transmits ACK in each unit time "A". The radio environment cognition unit calculates "Cd" representing an average reception time interval by way of an equation of $Cd=A \div Bd$, and then it calculates "Ed" representing a downlink average packet arrival time error by way of an equation of $Ed=D-Cd$ where D denotes a packet transmission time interval, thus measuring distribution characteristics of the downlink average packet arrival time error as delay time variation data in downlink communication.

In a second aspect of the present invention, the radio module counts "G" representing the number of times it receive NACK in each unit time "A". The radio environment cognition unit calculates "I" representing an uplink average accumulated delay time by way of an equation of $I=G \times H$ where H denotes the time required for repeating a single data packet, thus measuring distribution characteristics of the uplink average accumulated delay time as delay time variation data in uplink communication.

Alternatively, the radio module counts "Gd" representing the number of times it transmits NACK in each unit time "A". The radio environment cognition unit calculates "Id" representing a downlink average accumulated delay time by way of an equation of $Id=Gd \times H$ where H denotes a time required for repeating a single data packet, thus measuring distribution characteristics of the downlink average accumulated delay time as delay time variation data in downlink communication.

In a third aspect of the present invention, the radio module counts "B" representing the number of times it receives ACK in each unit time A, and "G" representing the number of times it receives NACK in each unit time A. The radio environment cognition unit calculates "K" representing an uplink average packet repeat delay time by way of an equation of $K=G \div B \times H$ where H denotes a time required for repeating a single data packet, thus measuring distribution characteristics of the uplink average packet repeat delay time as delay time variation data in uplink communication.

Alternatively, the radio module counts "Bd" representing the number of times it transmits ACK in each unit time A and "Gd" representing the number of times it transmits NACK in each unit time A. The radio environment cognition unit calculates "Kd" representing an downlink average packet repeat delay time by way of an equation of $Kd=Gd \div Bd \times H$ where H denotes a time required for repeating a single data packet, thus measuring distribution characteristics of the downlink average packet repeat delay time as delay time variation data in downlink communication.

In a fourth aspect of the present invention, the radio module records a first reception time "R1" for receiving a data packet in each unit time "A" and a second reception time "R2" for acknowledging the success of reception with respect to the data packet. The radio environment cognition unit calculates "M" representing a downlink average packet delay time by way of an equation of $M=R2-R1$, thus measuring distribution characteristics of the downlink average packet delay time as delay time variation data in downlink communication.

As described above, the present invention allows the wireless terminal incorporating the communication characteristic measuring device to measure characteristics of delay time variations based on the reception acknowledgement information in the prescribed communication range with respect to each radio media, uplink communication, and downlink communication independently. Thus, it is possible to appropriately switch over radio media in communications between wireless terminals in the radio communication system.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENTS

The present invention will be described in further detail by way of examples with reference to the accompanying drawings.

Figure 1:
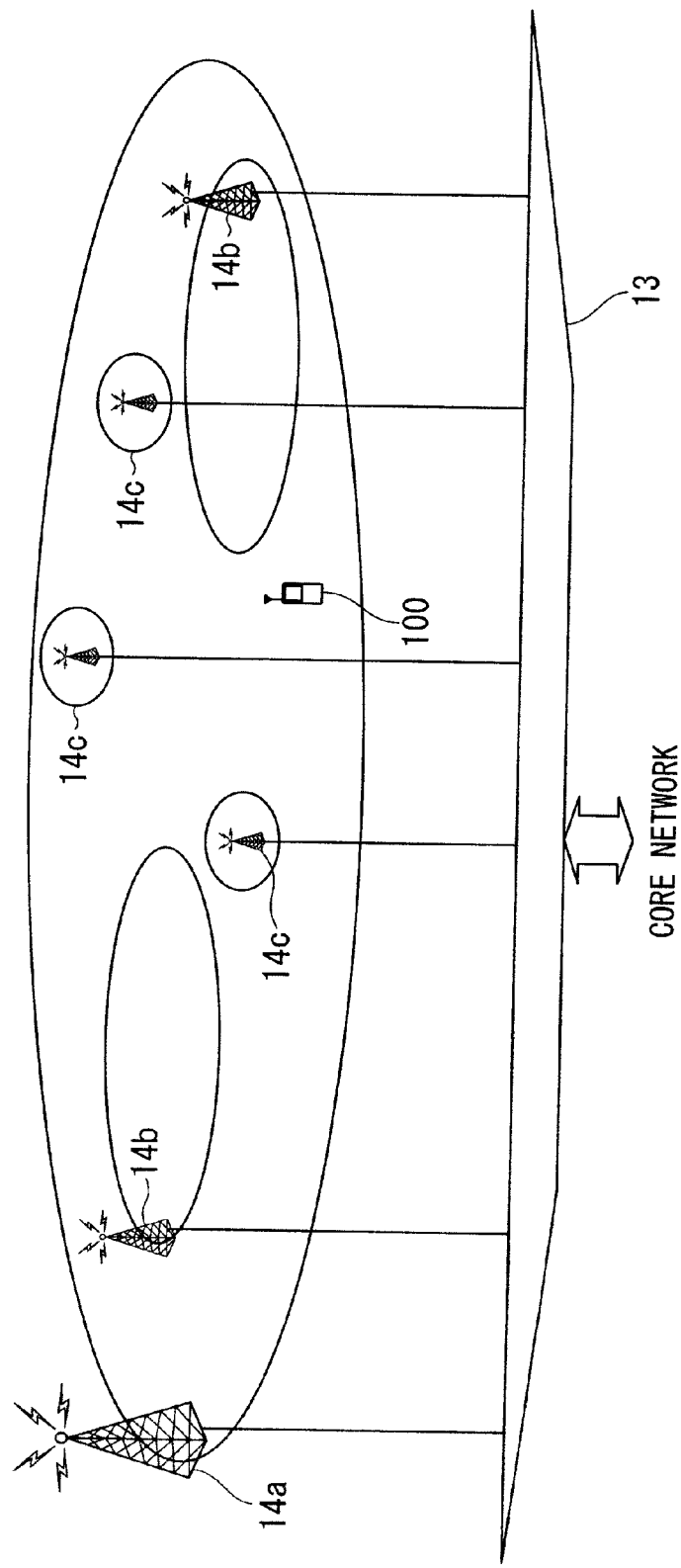
FIG. 1 is a schematic illustration showing a radio communication network using a cognitive base station adapted to the present invention.

FIG. 1 is a schematic illustration showing a radio communication network using a cognitive base station adapted to the present invention.

The cognitive base station includes a macro-cell radio module 14a, a micro-cell radio module 14b, and a pico-cell radio module 14c. The macro-cell radio module 14a configures a macro-cell covering the broadest communication area. The macro-cell is a cellular cell provided by a certain cellular phone service operator, for example. The micro-cell radio module 14b configures a micro-cell whose communication area is smaller than that of the macro-cell. The micro-cell is a cell defined by "Mobile WiMAX" based on "IEEE802.16" or "Mobile Broadband Wireless Access (MBWA)" based on "IEEE802.20", for example.

The pico-cell radio module 14c configures a pico-cell whose communication area is smaller than that of the micro-cell. The pico-cell is a cell of a wireless LAN based on "IEEE802.11", for example. Both the micro-cell and the pico-cell are disposed inside the macro-cell. In this connection, the present invention is not necessarily limited to the following embodiments in terms of radio media.

The macro-cell radio module 14a, the micro-cell radio module 14b, and the pico-cell radio module 14c are connected to a switch 13 via communication lines. FIG. 1 does depict the other configurations (other than the above configurations) related to the cognitive base station.

As shown in FIG. 1, the switch 13 covers a single macro-cell so that it embraces all the micro-cells and pico-cells included in such macro-cell. That is, the switch 13 covers one macro-cell and its micro-cells and pico-cells (included in the macro-cell), which are thus processed in the same link layer.

Figure 2:
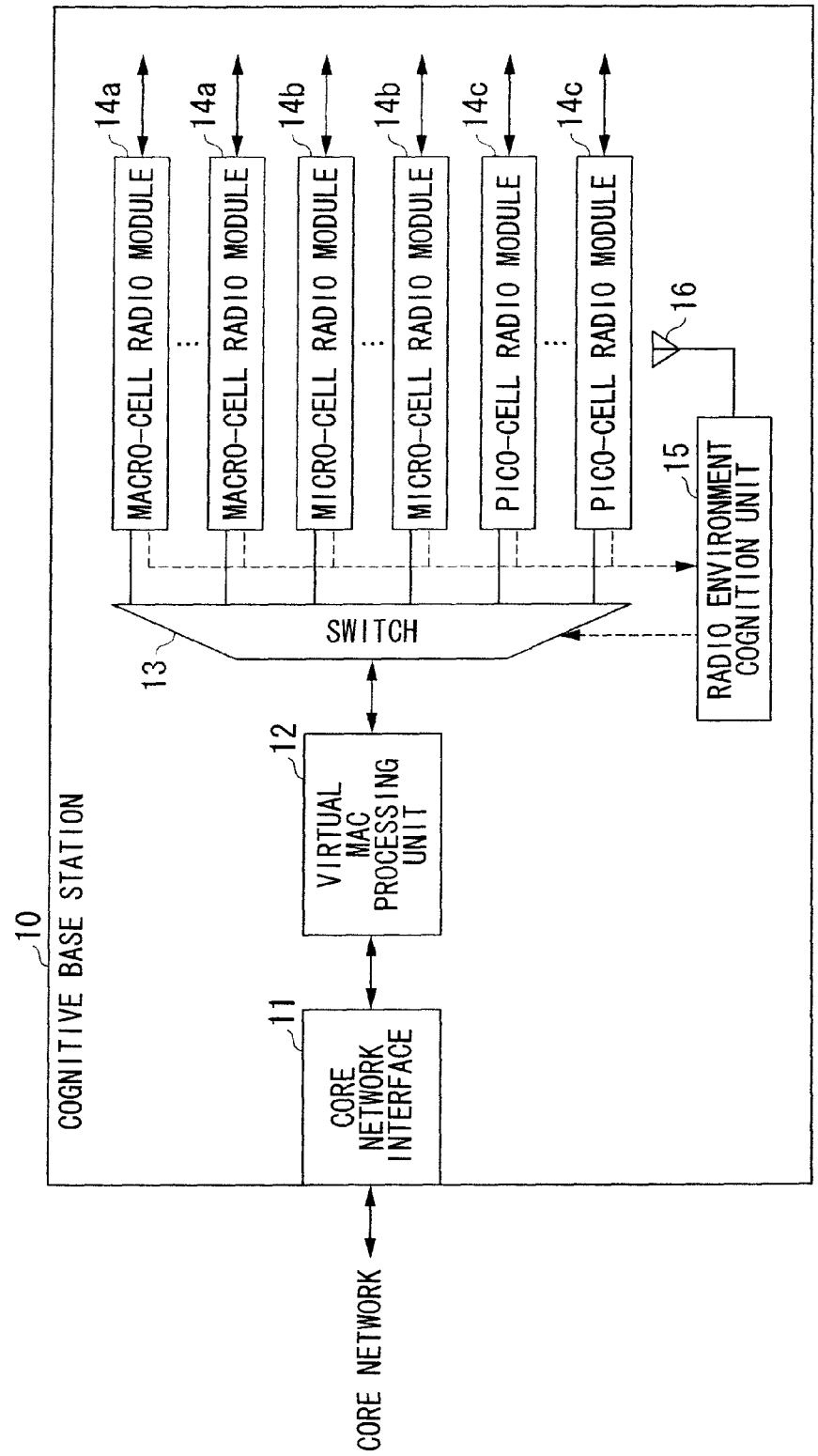
FIG. 2 is a block diagram showing the configuration of the cognitive base station including a switch and radio modules.

FIG. 2 is a block diagram showing the configuration of a cognitive base station 10 adapted to the radio communication network shown in FIG. 1. The cognitive base station 10 includes a core-network interface 11, a virtual MAC processing unit (where MAC stands for Media Access Control) 12, the switch 13, a plurality of radio modules 14 (which are coordinated with respective radio media), and a radio environment cognition unit 15. As the radio modules 14, the cognitive base station 10 includes macro-cell radio modules 14a, micro-cell radio modules 14b, and pico-cell radio modules 14c.

The cognitive base station 10 is connected to a core network (connected to the existing networking system, not shown) via the core network interface 11. That is, the cognitive base station 10 is connected to other cognitive base stations via the core network. In addition, the cognitive base station 10 is accessible to external networks such as the Internet via the core network.

As communication data for the network layer, the core network interface 11 receives and transmits IP packets (where IP stands for Internet Protocol) in connection with the core network.

The virtual MAC processing unit 12 establishes links using virtual MAC addresses which are physical addresses and which are univocally allocated to base stations and terminals. The virtual MAC processing unit 12 of the cognitive base station 10 establishes links using virtual MAC addresses in cooperation with virtual MAC processing units of cognitive terminals (not shown).

The virtual MAC processing unit 12 produces transmitting frames using established links. For the sake of convenience, transmitting frames will be referred to as "link frames", which stores IP packets given from the core network. The virtual MAC processing unit 12 forwards link frames to the switch 13. In addition, the virtual MAC processing unit 12 receives link frames from the switch 13 so as to extract IP packets from link frames. Then, IP packets are forwarded to the core network interface 11.

The switch 13 delivers link frames (output from the virtual MAC processing unit 12) to the radio modules 14. In addition, the switch 13 forwards link frames (output from the radio modules 14) to the virtual MAC processing unit 12.

Each of the radio modules 14 has a unique MAC address. For the sake of convenience, the unique MAC addresses of the radio modules 14 will be referred to as "real MAC addresses" which are distinct from "virtual MAC addresses". Real MAC addresses have been conventionally used. The radio modules 14 establish radio links using real MAC addresses with other radio modules sharing the same radio media. Radio links are established in units of frequency channels.

The radio modules 14 generate transmitting frames to be transmitted via radio links, wherein transmitting frames store link frames output from the switch 13. In addition, the radio modules 14 extract link frames from received frames via radio links so as to forward them to the switch 13.

The radio environment cognition unit 15 detects radio environments so as to instruct the switch 13 with destinations to which link frames (output from the virtual MAC processing unit 12) are to be delivered. Specifically, the radio environment cognition unit 15 acquires the radio information from the radio modules 14. Herein, the radio environment cognition unit 15 is equipped with a sensor antenna 16 which observes communication data so as to acquire the radio information. The radio information includes RSSI values (where RSSI stands for Received Signal Strength Indicator), background noise levels, modulation methods, the amount of transmission-waiting data accumulated in transmission buffers, the number of times the NACK (representing the failure of transmission) is received from the counterpart station, and the rejection rate indicating the level of defectiveness or rejection with respect to received frames transmitted from the counterpart station, for example.

Alternatively, the cognitive base station 10 receives characteristic data representing delay time variations (hereinafter referred to as delay time variation data) from cognitive terminals connected thereto. Delay time variation data are received by the radio environment cognition unit 15. Delay time variation data are assigned to radio media independently; hence, they indicate characteristics of delay time variations with respect to each radio media.

Based on the radio information or delay time variation data, the radio environment cognition unit 15 evaluates the state of each radio media, for example, it determines which of the radio media renders a good state of communication. In addition, the radio environment cognition unit 15 determines which of the frequency channels of the selected radio media renders a good state of communication. Using long-term and short-term statistics data, the radio environment cognition unit 15 estimates the radio media presumably rendering a good state of communication and the frequency channel presumably rendering a good state of communication in the future.

Based on the state of each radio media, the radio environment cognition unit 15 selects the radio module 14 used for uplink communication. The radio environment cognition unit 15 instructs the switch 13 to use the selected radio module 14 for uplink communication. In connection with destinations of delivering link frames via radio media which presently render a good state of communication or which will presumably render a good state of communication in the future, the radio environment cognition unit 15 designates one or a plurality of radio modules 14 and also designates one or a plurality of frequency channels of the designated radio modules 14. In addition, it determines the distribution ratio for the switch 13 based on the state of each radio media. The cognitive base station 10 sends all pieces of information regarding the radio module 14 used for uplink communication to the counterpart cognitive terminal, the switch of which is thus connected to the corresponding radio module subjected to uplink communication.

The cognitive base station 10 receives the information regarding the radio module of the cognitive terminal used for downlink communication so that the switch 13 is connected to the radio module 14 used for downlink communication in correspondence with the switch of the cognitive terminal.

Figure 3:
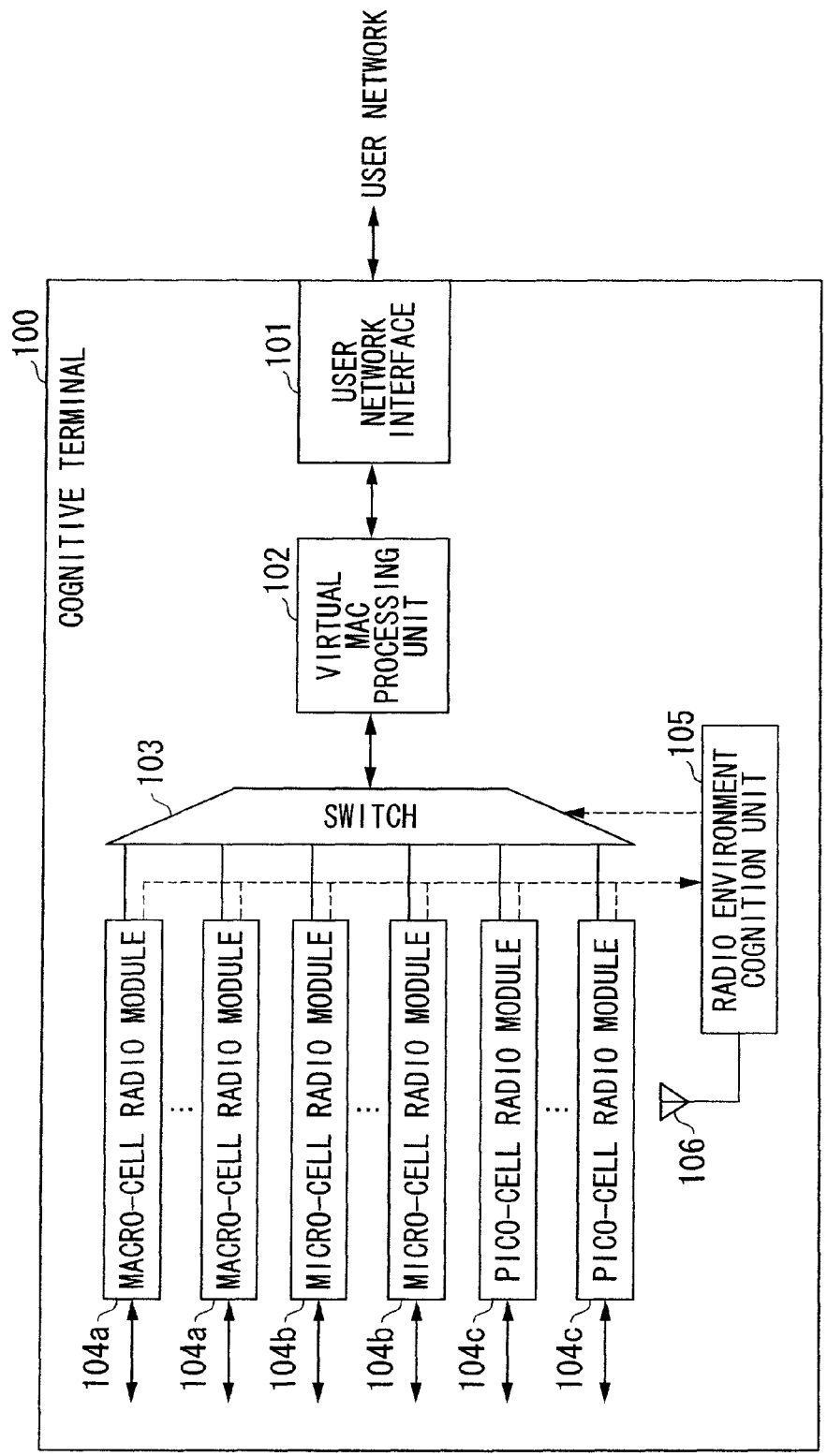
FIG. 3 is a block diagram showing the configuration of a cognitive terminal including a switch and radio modules.

FIG. 3 is a block diagram showing the configuration of a cognitive terminal 100, which is linked with the cognitive base station 10 shown in FIG. 2.

The cognitive terminal 100 includes a user network interface 101, a virtual MAC processing unit 102, a switch 103, a plurality of radio modules 104 (which are coordinated with respective radio media), and a radio environment cognition unit 105. The radio modules 104 include macro-cell radio modules 104a, micro-cell radio modules 104b, and pico-cell radio modules 104c.

The cognitive terminal 100 is connected to a user network such as a LAN via the user network interface 101. The cognitive terminal 100 is accessible to external networks such as the Internet via the user network. The user network interface 101 receives and transmits IP packets in the user network as communication data in the network layer.

The virtual MAC processing unit 102 establishes links using virtual MAC addresses. The virtual MAC processing unit 102 of the cognitive terminal 100 establishes links with the virtual MAC processing unit 12 of the cognitive base station 10. Using established links, the virtual MAC processing unit 102 produces link frames, which are then forwarded to the switch 103. In addition, the virtual MAC processing unit 102 extracts IP packets from link frames (output from the switch 103) so as to forward them to the user network interface 101.

The switch 103 delivers link frames (output from the virtual MAC processing unit 102) to the radio modules 104 or forwards link frames (output from the radio modules 104) to the virtual MAC processing unit 102.

The radio modules 104 have unique "real" MAC addresses. The radio modules 104 establish radio links using real MAC addresses with other radio modules sharing the same radio media. The radio modules 104 generate transmitting frames using radio links. Transmitting frames store link frames output from the switch 103. The radio modules 104 extract link frames from received frames via radio links so as to forward them to the switch 103.

The radio environment cognition unit 105 measures delay time variation data with respect to radio media. That is, the radio environment cognition unit 105 receives the reception acknowledgement information from each radio module 104 with respect to transmitting frames. Using the reception acknowledgement information of transmitting frames via radio media, the radio environment cognition unit 105 generates delay time variation data, which are then sent to the cognitive base station 10.

In addition, the radio environment cognition unit 105 acquires the radio information from each radio module 104. Herein, the radio environment cognition unit 105 uses a sensor antenna 106 observing radio communication so as to acquire the radio information. Based on the radio information or delay time variation data, the radio environment cognition unit 105 selects the radio module 104 used for downlink communication. The radio environment cognition unit 105 instructs the switch 103 to use the selected radio module 104 for downlink communication. The information regarding the radio module 104 opted for downlink communication is sent to the cognitive base station 10, in which the switch 13 selects the corresponding radio module 14 used for downlink communication.

The cognitive base station 10 sends the information regarding the radio module opted for uplink communication to the cognitive terminal 100; hence, switch 103 of the cognitive terminal 100 selects the radio module 104 for uplink communication in coordination with the switch 13 of the cognitive base station 10.

The macro-cell radio modules 104a of the cognitive terminal 100 establish radio links with the macro-cell radio modules 14a of the cognitive base station 10. In addition, the micro-cell radio modules 104b establish radio links with the micro-cell radio modules 14b. The pico-cell radio modules 104c establish radio links with the pico-cell radio modules 14c.

Based on delay time variation data, the cognitive terminal 100 determines radio modules 104 used for uplink communication and downlink communication respectively so as to notify their information to the cognitive base station 10. As an alternative scheme, the cognitive base station 10 determines radio modules used for downlink communication, while the cognitive terminal 100 determines radio modules used for uplink communication.

The cognitive terminal 100 employs the following measurement method for measuring delay time variation data.

Figure 4:
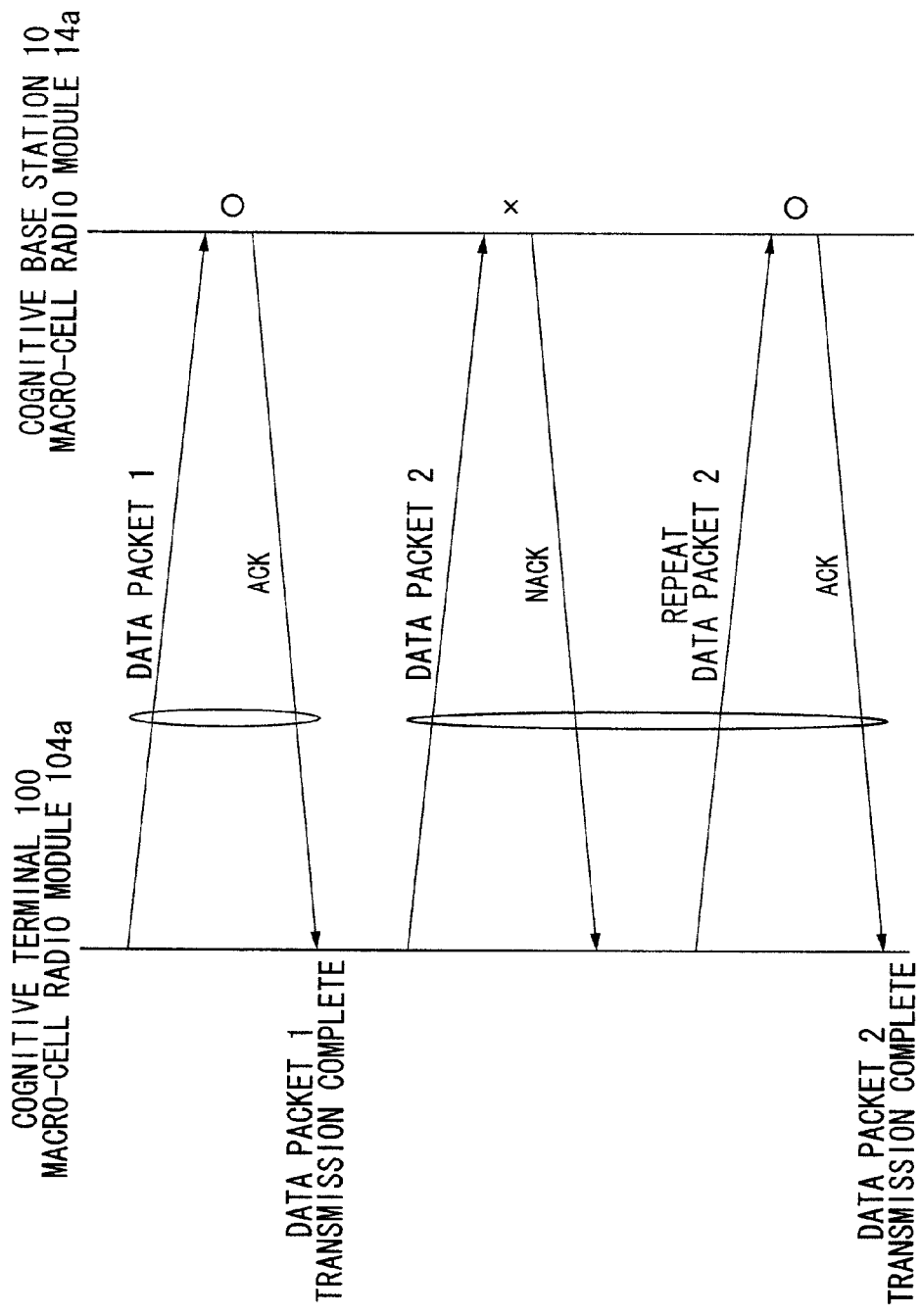
FIG. 4 is a sequence chart showing procedures for the reception acknowledgement of packet data transferred between macro-cell radio modules of the cognitive base station and cognitive terminal.

FIG. 4 is a sequence chart explaining procedures for the reception acknowledgement of frames (or data packets) in accordance with the HARQ, in which uplink communication is made using macro-cell radio modules, for example.

Upon the success of reception of each data packet, the macro-cell radio module 14a of the cognitive base station 10 sends ACK to the macro-cell radio module 104a of the cognitive terminal 100. Upon the failure of reception of a data packet, the macro-cell radio module 14a sends NACK to the macro-cell radio module 104a. Every time the macro-cell radio module 104a receives NACK, it repeats the corresponding data packet.

In accordance with procedures for the reception acknowledgement of data packets, the cognitive terminal 100 employs the following measurement method for measuring delay time variation data.

The radio environment cognition unit 105 of the cognitive terminal 100 is designed to measure delay time variation data in accordance with each of the following embodiments, which will be described with respect to single radio media. In the measurement of delay time variation data via single radio media, the radio environment cognition unit 105 receives the reception acknowledgement information (i.e. ACK or NACK) from the radio module 104 (e.g. the macro-cell radio module 104a). Using the reception acknowledgement information, the radio environment cognition unit 105 generates delay time variation data.

1. First Embodiment

Figure 5:
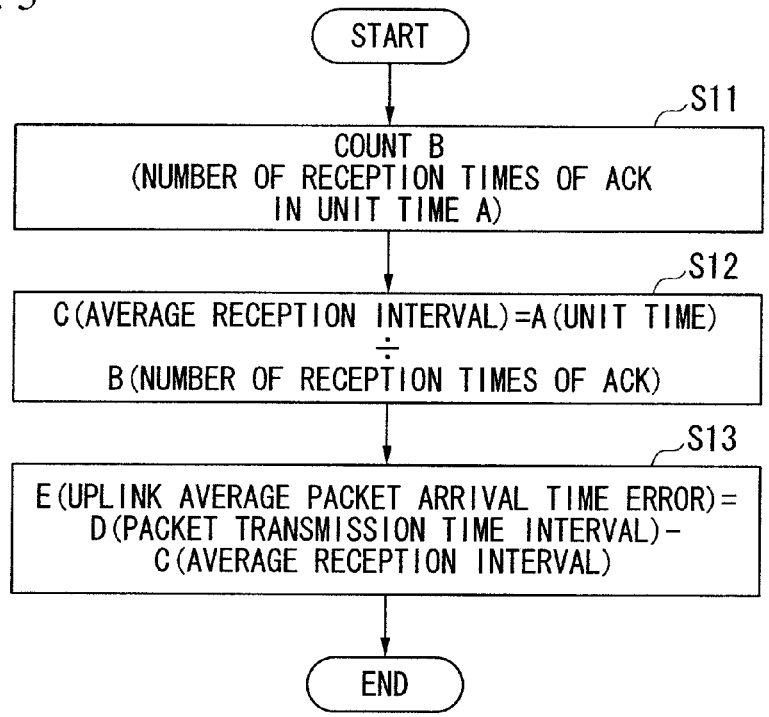
FIG. 5 is a flowchart showing a measurement method for measuring delay time variation data in accordance with a first embodiment.
Figure 6:
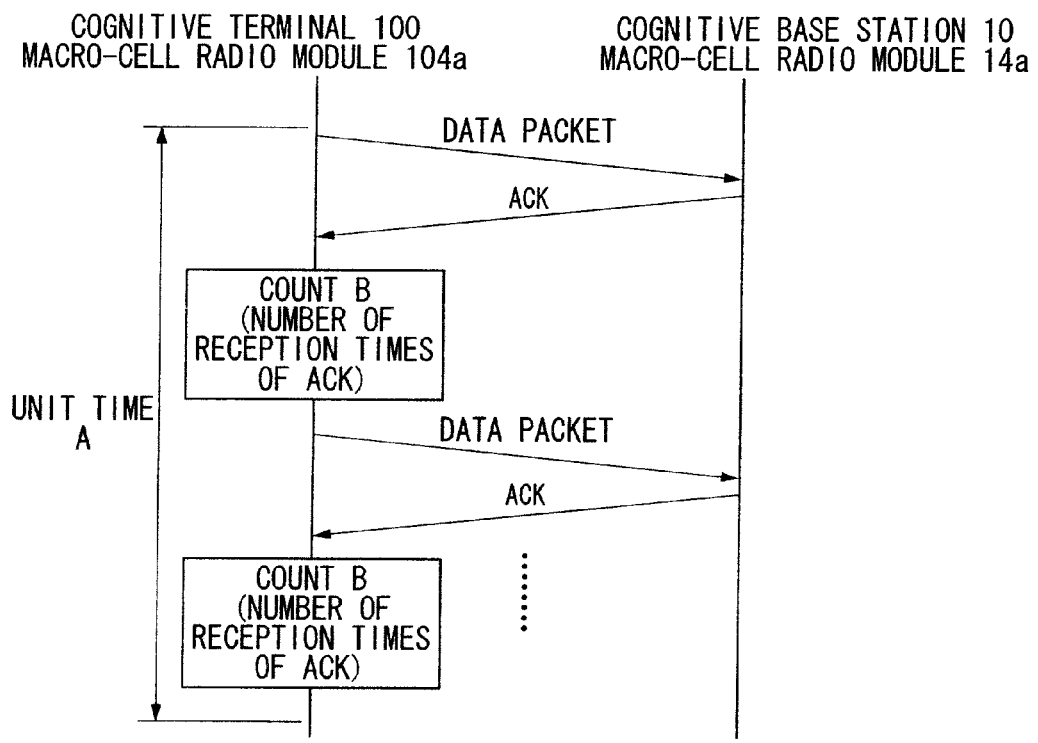
FIG. 6 is a sequence chart showing the measurement method for measuring delay time variation data according to the first embodiment.
Figure 7:
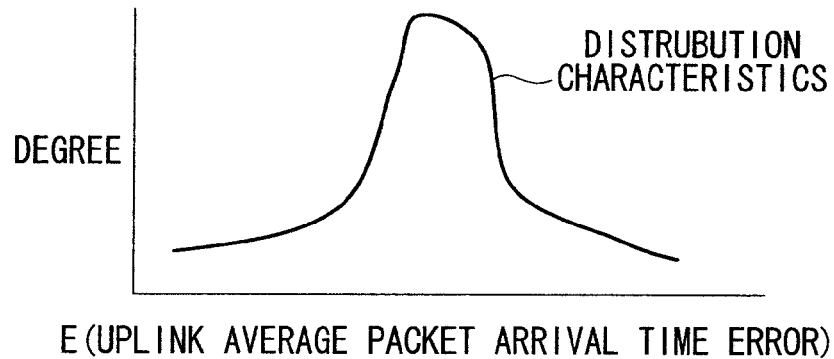
FIG. 7 is a graph exemplifying delay time variation data, i.e. an uplink average packet arrival time error.

FIG. 5 is a flowchart showing the measurement method for measuring delay time variation data in accordance with a first embodiment. FIG. 6 is a sequence chart showing the measurement method for measuring delay time variation data according to the first embodiment. FIG. 7 is a graph exemplifying delay time variation data. The first embodiment demonstrates the measurement of delay time variation data in uplink communication using the macro-cell radio module 104*a*.

The measurement method of delay time variation data according to the first embodiment will be described with reference to FIGS. 5 and 6.

Step S11: The macro-cell radio module 104*a* counts the number of times "B" it receives ACK in each unit time "A" (e.g. one second).

Step S12: The radio environment cognition unit 105 calculates an average reception time interval C by way of an equation of C=A÷B.

Step S13: The radio environment cognition unit 105 calculates an uplink average packet arrive time error E by way of an equation of E=D−C where D denotes the transmission time interval of data packets which is a fixed time interval, e.g. 20 mili-second in the case of VoIP.

Measurement examples where A=1 second, and D=20 seconds are as follows:

Times 1-2 seconds: B=40, C=25 milli-second, and E=5 milli-second.

Times 2-3 seconds: B=30, C=33 milli-second, and E=13 milli-second.

The radio environment cognition unit 105 calculates distribution characteristics (i.e. histograms) of the uplink average packet arrival time error E, an example of which is shown in FIG. 7.

The radio environment cognition unit 105 determines delay time variation data based on distribution characteristics of the uplink average packet arrival time error E. Based on delay time variation data, it is possible to detect the characteristics of delay time variations in uplink communication using the macro-cell radio module 104*a*.

The first embodiment demonstrates the measurement of the uplink average packet arrival time error E in uplink communication, but it is possible to measure a downlink average packet arrival time error in downlink communication in a similar manner. In order to calculate a downlink average packet arrive time error "Ed" in downlink communication, the macro-cell radio module 104*a* counts the number of times "Bd" it transmits ACK in each unit time A. Subsequently, the radio environment cognition unit 105 calculates an average transmission time interval "Cd" by way of an equation of Cd=A÷Bd. Then, it calculates the downlink average packet arrival time error "Ed" by way of an equation of Ed=D−Cd.

2. Second Embodiment

Figure 8:
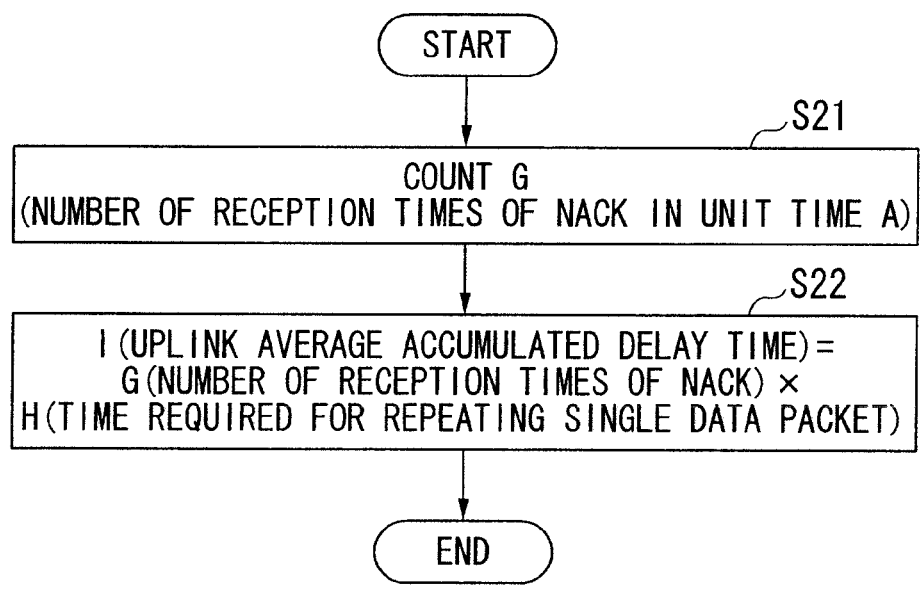
FIG. 8 is a flowchart showing a measurement method for measuring delay time variation data in accordance with a second embodiment.
Figure 9:
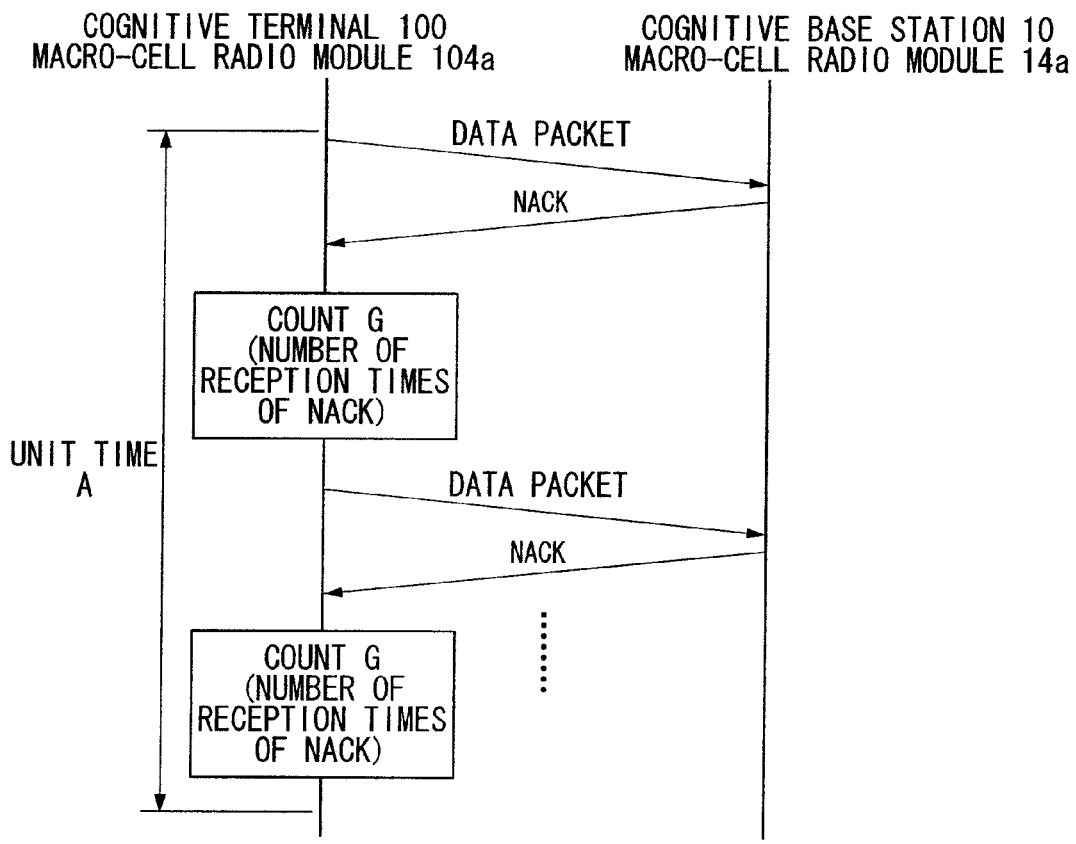
FIG. 9 is a sequence chart showing the measurement method for measuring delay time variation data according to the second embodiment.
Figure 10:
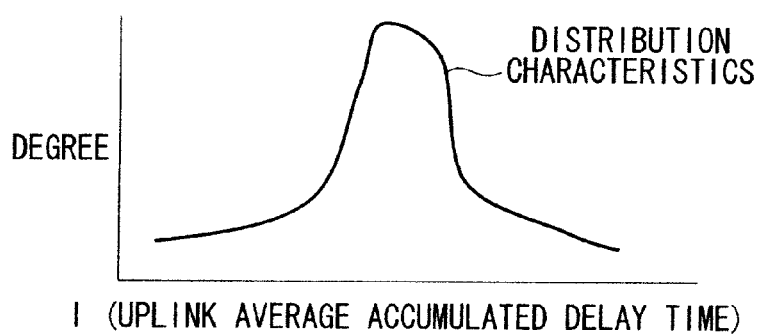
FIG. 10 is a graph exemplifying delay time variation data, i.e. an uplink average accumulated delay time.

FIG. 8 is a flowchart showing the measurement method for measuring delay time variation data in accordance with a second embodiment. FIG. 9 is a sequence chart showing the measurement method for measuring delay time variation data according to the second embodiment. FIG. 10 is a graph exemplifying delay time variation data. The second embodiment demonstrates the measurement of delay time variation data in uplink communication using the macro-cell radio module 104*a*.

The measurement method of delay time variation data according to the second embodiment will be described with reference to FIGS. 8 and 9.

Step S21: The macro-cell radio module 104*a* counts the number of times G it receives NACK in each unit time A (e.g. one second).

Step S22: The radio environment cognition unit 105 calculates an uplink average accumulated delay time I by way of an equation of I=G×H where H denotes a time required for repeating a single data packet which is a fixed time, e.g. 8 milli-seconds for one-time repetition according to the HARQ.

Measurement examples where A=1 second, and H=8 milli-seconds are as follows:

Times 1-2 seconds: G=10, I=80 milli-seconds.

Times 2-3 seconds: G=20, I=160 milli-seconds.

The radio environment cognition unit 105 calculates distribution characteristics of the uplink average accumulated delay time I, an example of which is shown in FIG. 10.

The radio environment cognition unit 105 determines delay time variation data based on distribution characteristics of the uplink average accumulated delay time I. Based on delay time variation data, it is possible to detect the characteristics of delay time variations in uplink communication using the macro-cell radio module 104*a*.

The second embodiment demonstrates the measurement of the uplink average accumulated delay time I in uplink communication, but it is possible to measure a downlink average accumulated delay time in downlink communication in a similar manner. In order to calculate a downlink average accumulated delay time "Id" in downlink communication, the macro-cell radio module 104*a* counts the number of times "Gd" it transmits NACK in each unit time A. Subsequently, the radio environment cognition unit 105 calculates the downlink average accumulated delay time Id by way of an equation of Id=Gd×H.

3. Third Embodiment

Figure 11:
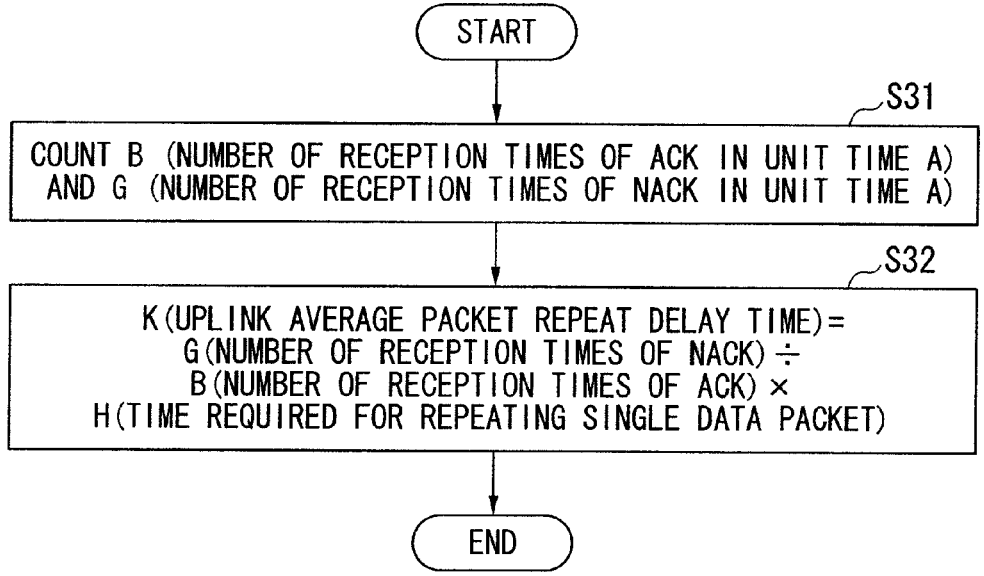
FIG. 11 is a flowchart showing a measurement method for measuring delay time variation data in accordance with a third embodiment.
Figure 12:
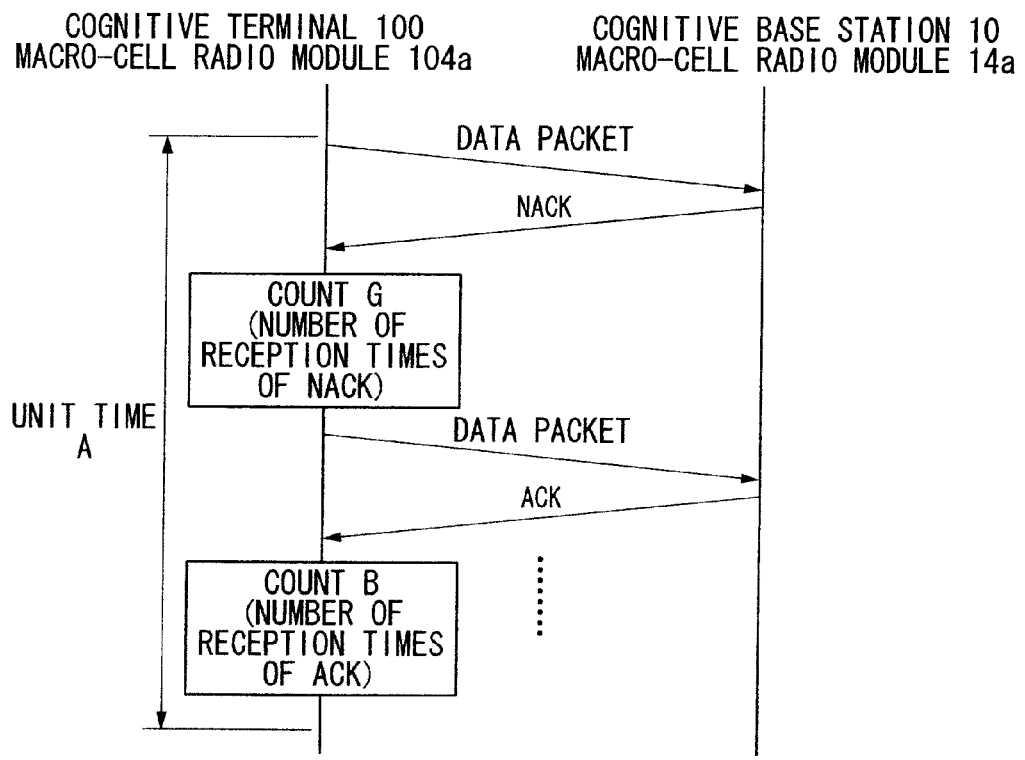
FIG. 12 is a sequence chart showing the measurement method for measuring delay time variation data according to the third embodiment.
Figure 13:
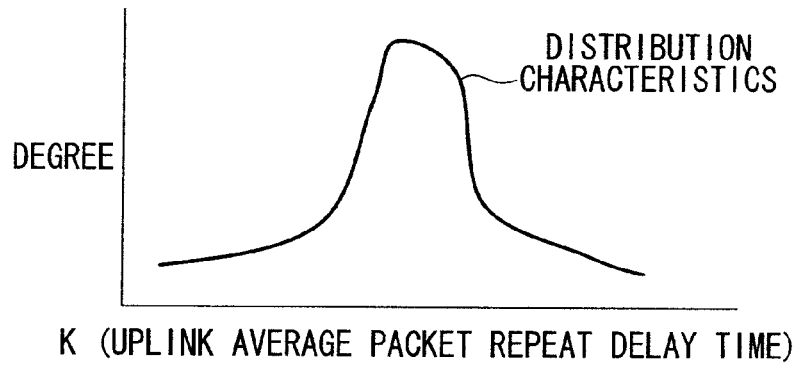
FIG. 13 is a graph exemplifying delay time variation data, i.e. an uplink average packet repeat delay time.

FIG. 11 is a flowchart showing the measurement method for measuring delay time variation data in accordance with a third embodiment. FIG. 12 is a sequence chart showing the measurement method for measuring delay time variation data according to the third embodiment. FIG. 13 is a graph exemplifying delay time variation data. The third embodiment demonstrates the measurement of delay time variation data in uplink communication using the macro-cell radio module 104*a*.

The measurement method of delay time variation data according to the third embodiment will be described with reference to FIGS. 11 and 12.

Step S31: The macro-cell radio module 104*a* counts the number of times B it receives ACK in each unit time A (e.g. one second) and the number of times G it receives NACK in each unit time A.

Step S32: The radio environment cognition unit 105 calculates an uplink average packet repeat delay time K by way of an equation of K=(G÷B)×H where H denotes a time required for repeating a single data packet which is a fixed time, e.g. 8 milli-seconds for one-time repetition according to the HARQ.

A measurement example where A=1 second, and H=8 milli-seconds is as follows:

Times 1-2 seconds: G=10, B=50, K=1.6 milli-seconds.

The radio environment cognition unit 105 calculates distribution characteristics of the uplink average packet repeat delay time K, an example of which is shown in FIG. 13.

The radio environment cognition unit 105 determines delay time variation data based on distribution characteristics of the uplink average packet repeat delay time K. Based on delay time variation data, it is possible to detect the characteristics of delay time variations in uplink communication using the macro-cell radio module 104*a*.

The third embodiment demonstrates the measurement of the uplink average packet repeat delay time K in uplink communication, but it is possible to measure a downlink average packet repeat delay time in downlink communication in a similar manner. In order to calculate a downlink average packet repeat delay time "Kd" in downlink communication, the macro-cell radio module 104a counts the number of times "Bd" it transmits ACK in each unit time A and the number of times "Gd" it transmits NACK in each unit time A. Subsequently, the radio environment cognition unit 105 calculates the downlink average packet repeat delay time Kd by way of an equation of Kd=(Gd÷Bd)×H.

4. Fourth Embodiment

Figure 14:
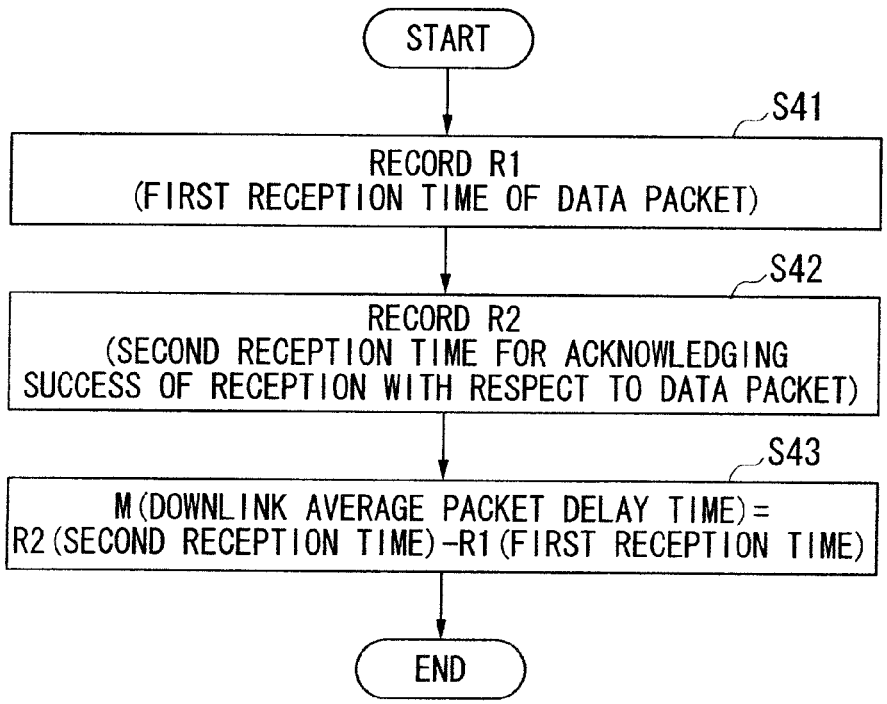
FIG. 14 is a flowchart showing a measurement method for measuring delay time variation data in accordance with a fourth embodiment.
Figure 15:
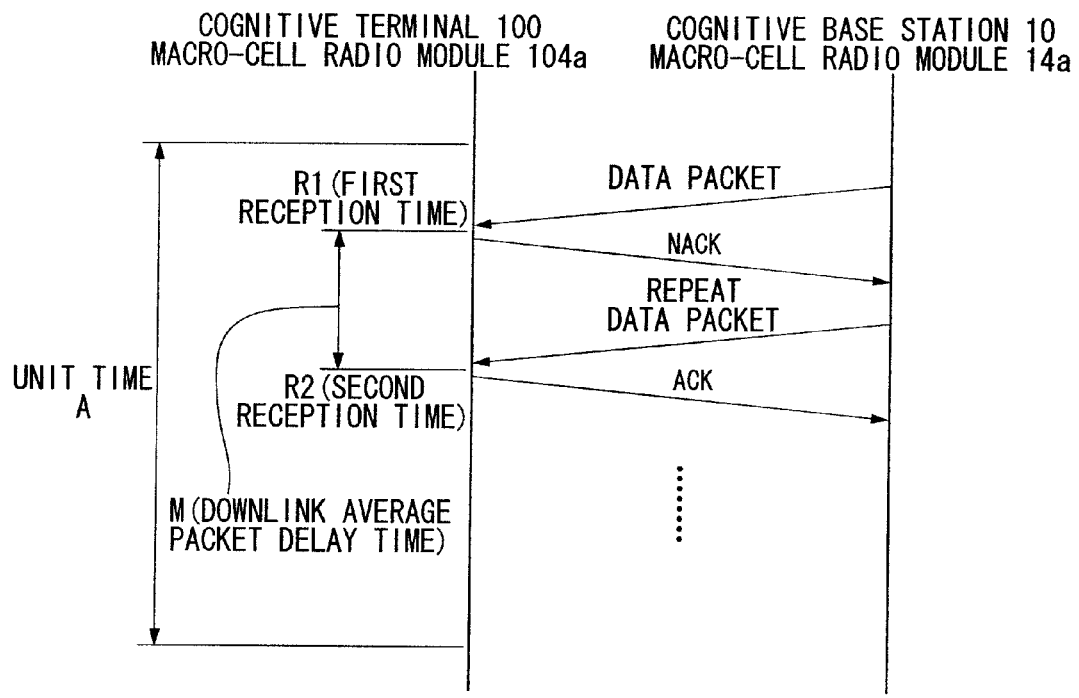
FIG. 15 is a sequence chart showing the measurement method for measuring delay time variation data according to the fourth embodiment.
Figure 16:
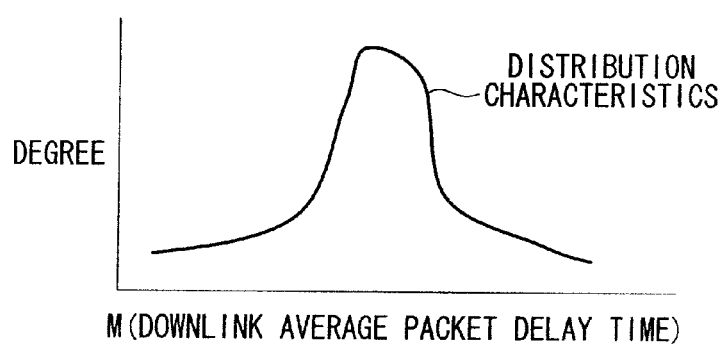
FIG. 16 is a graph exemplifying delay time variation data, i.e. a downlink average packet delay time.

FIG. 14 is a flowchart showing the measurement method for measuring delay time variation data in accordance with a fourth embodiment. FIG. 15 is a sequence chart showing the measurement method for measuring delay time variation data according to the fourth embodiment. FIG. 16 is a graph exemplifying delay time variation data. The fourth embodiment demonstrates the measurement of delay time variation data in uplink communication using the macro-cell radio module 104a.

The measurement method of delay time variation data according to the fourth embodiment will be described with reference to FIGS. 14 and 15.

Step S41: The macro-cell radio module 104a records a first reception time R1 of a data packet in each unit time A.

Step S42: The macro-cell radio module 104a records a second reception time R2 at which it acknowledges the success of reception with respect to the data packet received at the first reception time R1. As the second reception time R2, it is possible to use the time the macro-cell radio module 104a transmits ACK with respect to the data packet received at the first reception time R1.

Step S43: The radio environment cognition unit 105 calculates downlink average packet delay time M by way of an equation of M=R2−R1.

The radio environment cognition unit 105 calculates distribution characteristics of the downlink average packet delay time M, an example of which is shown in FIG. 16.

The radio environment cognition unit 105 determines delay time variation data based on distribution characteristics of the downlink average packet delay time M. Based on delay time variation data, it is possible to detect the characteristics of delay time variations in downlink communication using the macro-cell radio module 104a.

The above embodiments are designed to measure delay time variation data using the reception acknowledgement information of frames (i.e. data packets in communication ranges) in the wireless terminal with respect to uplink communication, downlink communication, and radio media independently. Based on delay time variation data, it is possible to detect the characteristics of delay time variations with respect to each radio media and each direction of communication. This demonstrates an outstanding effect allowing the radio communication system to appropriately switch over radio media.

The present invention does not exploit radio resources for measurement, since it does not need probe packets exclusively used for measurement. The present invention can accommodate an increased number of wireless terminals connected to the radio communication system, since the measurement is performed by each wireless terminal.

It is possible to rectify the above embodiments in various ways via modifications and design changes. The above embodiments are each designed such that the macro-cell radio module 14a, the micro-cell radio module 14b, the pico-cell radio module 14c, and the switch 13 are placed at different positions within the prescribed area covered by the cognitive base station 10; but this is not a restriction. For example, it is possible to arrange them at the same position or to install them in the same housing.

Lastly, the present invention is not necessarily limited to the above embodiments, which can be further modified within the scope of the invention as defined by the appended claims.

What is claimed is:

1. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "B" representing the number of times it receives ACK in a unit time "A", wherein the radio environment cognition unit calculates "C" representing an average reception time interval by way of an equation of C=A÷B, and wherein the radio environment cognition unit calculates "E" representing an uplink average packet arrival time error by way of an equation of E=D−C where D denotes a packet transmission time interval, thus measuring distribution characteristics of the uplink average packet arrival time error as the delay time variation data in uplink communication.

2. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "Bd" representing the number of times it transmits ACK in a unit time "A", wherein the radio environment cognition unit calculates "Cd" representing an average reception time interval by way of an equation of Cd=A÷Bd, and wherein the radio environment cognition unit calculates "Ed" representing a downlink average packet arrival time error by way of an equation of Ed=D−Cd where D denotes a packet transmission time interval, thus measuring distribution characteristics of the downlink average packet arrival time error as the delay time variation data in downlink communication.

3. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "G" representing the number of times it receive NACK in a unit time "A", and wherein the radio environment cognition unit calculates "I" representing an uplink average accumulated delay time by way of an equation of $I=G \times H$ where H denotes a time required for repeating a single data packet, thus measuring distribution characteristics of the uplink average accumulated delay time as the delay time variation data in uplink communication.

4. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "Gd" representing the number of times it transmits NACK in a unit time "A", and wherein the radio environment cognition unit calculates "Id" representing a downlink average accumulated delay time by way of an equation of $Id=Gd \times H$ where H denotes a time required for repeating a single data packet, thus measuring distribution characteristics of the downlink average accumulated delay time as the delay time variation data in downlink communication.

5. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "B" representing the number of times it receives ACK in a unit time A and "G" representing the number of times it receives NACK in the unit time A, and wherein the radio environment cognition unit calculates "K" representing an uplink average packet repeat delay time by way of an equation of $K=G \div B \times H$ where H denotes a time required for repeating a single data packet, thus measuring distribution characteristics of the uplink average packet repeat delay time as the delay time variation data in uplink communication.

6. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module counts "Bd" representing the number of times it transmits ACK in a unit time A and "Gd" representing the number of times it transmits NACK in the unit time A, and wherein the radio environment cognition unit calculates "Kd" representing an downlink average packet repeat delay time by way of an equation of $Kd=Gd \div Bd \times H$ where H denotes a time required for repeating a single data packet, thus measuring distribution characteristics of the downlink average packet repeat delay time as the delay time variation data in downlink communication.

7. A communication characteristic measuring device adapted to a wireless terminal performing communication using a plurality of radio media via a base station in a radio communication system, comprising:

a plurality of radio modules, each of which obtains reception acknowledgement information regarding a data packet transmitted to or received from a counterpart wireless terminal in a prescribed communication range independently with respect to each radio media; and a radio environment cognition unit that generates delay time variation data representing characteristics of delay time variations based on the reception acknowledgement information independently with respect to each radio media and each direction of communication, wherein the radio module records a first reception time "R1" for receiving a data packet in a unit time "A" and a second reception time "R2" for acknowledging success of reception with respect to the data packet, and wherein the radio environment cognition unit calculates "M" representing a downlink average packet delay time by way of an equation of $M=R2-R1$, thus measuring distribution characteristics of the downlink average packet delay time as the delay time variation data in downlink communication.

* * * * *